United States Patent [19]

Schulze

[11] Patent Number: 4,837,912

[45] Date of Patent: Jun. 13, 1989

[54] HYDRAULIC DRIVING ARRANGEMENT FOR POSITIONING WORKPIECES IN CORRECT RELATIONSHIP TO TOOL HEADS OF A MULTI-STATION MACHINE TOOL

[75] Inventor: Eckehart Schulze, Weissach, Fed. Rep. of Germany

[73] Assignee: Hartmann & Lammle GmbH Co., KG, Schuckertstrabe, Fed. Rep. of Germany

[21] Appl. No.: 18,401

[22] Filed: Feb. 25, 1987

Related U.S. Application Data

[63] Continuation of Ser. No. 817,625, Jan. 10, 1986, abandoned.

[30] Foreign Application Priority Data

Jun. 10, 1983 [DE] Fed. Rep. of Germany ....... 3321120

[51] Int. Cl.⁴ ............................................ B23Q 39/04
[52] U.S. Cl. ............................. 29/38 C; 29/48.5 A; 74/813 L
[58] Field of Search ............. 29/38 C, 48.5 R, 48.5 A, 29/49; 408/71; 409/220, 221; 74/813 R, 813 C, 813 L

[56] References Cited

U.S. PATENT DOCUMENTS 2,900,849  8/1959  Hutchens et al. ................. 29/38 C
2,984,978  5/1960  Estabrook ........................ 409/221

Primary Examiner—Z. R. Bilinsky
Attorney, Agent, or Firm—Antonelli, Terry & Wands

[57] ABSTRACT

A hydraulic driving arrangement for circular indexing tables for the precise positioning of workpieces, with the exact position of the workpieces being determined by an index. A hydraulic motor is provided with an electro-hydraulic follow-up governor using a stepping motor for setting the desired values and a mechanical actual value indication arrangement. A monitoring arrangement positively coupled with the circular indexing table and/or a driving gear of the hydraulic motor indicates whether or not the circular indexing table is in a position suitable for bringing the indexing gear into engagement and, if so, emits a signal triggering the indexing process or, if the circular indexing table is not in the desired position, deactivates the indexing mechanism. The monitoring arrangement comprises a cam disk coupled with the circular indexing table via a gearing so that it performs exactly one rotation by 360° between two desired positions.

3 Claims, 2 Drawing Sheets

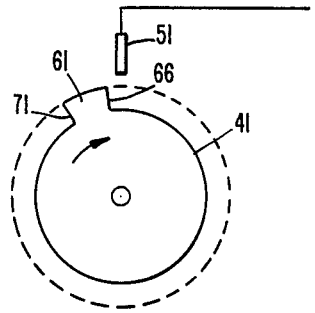
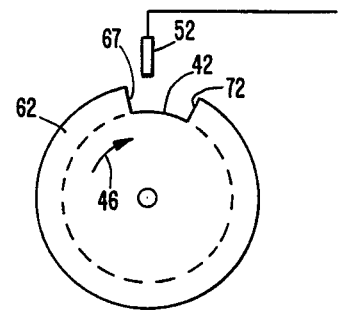
FIG. 2.
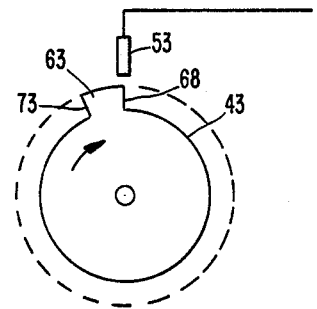

HYDRAULIC DRIVING ARRANGEMENT FOR POSITIONING WORKPIECES IN CORRECT RELATIONSHIP TO TOOL HEADS OF A MULTI-STATION MACHINE TOOL

This is a continuation of application Ser. No. 817,625, filed Jan. 10, 1986, now abandoned.

BACKGROUND OF THE INVENTION

The present invention relates to a driving arrangement and, more particularly, to a hydraulic driving arrangement for positioning workpieces in a correct relationship to tool heads of a machine tool having a plurality of stations arranged at preferably equal angular spacings about an axis of a circular indexing table, and with the workpieces being subject to a sequence of different processing operations carried out at the different working stations and cyclically advanced from working station to working station, with an exact position of the workpieces being defined by an index. A circular indexing table being movable to an approximate position, within predetermined tolerances, enters into a locking engagement with one of a plurality of index bodies associated with different positions of the circular indexing table so as to move and retain the workpieces in the correct position relative to the individual tools required for precise processing.

For positioning workpieces in an exact relationship with respect to a plurality of working station axes, a Geneva gear is normally employed due to the quickness and precision of such a Geneva drive; however, a disadvantage of a Geneva drive resides in the fact that they are very expensive to produce. Moreover, it is an operational disadvantage of Geneva drives that workpieces can be indexed only by a predetermined step size. Thus, for example, if one or more working stations are to be skipped, it is necessary to accelerate and stop, for example, the circular indexing table a corresponding number of times thereby resulting in relatively long overall cycle times.

The aim underlying the present invention essentially resides in providing a hydraulic drive arrangement of the aforementioned type which avoids the above noted disadvantages, ensuring precise positioning of the workpieces.

In accordance with advantageous features of the present invention, the circular indexing able is driven by a hydraulic motor which is controlled by an electro-hydraulic follow-up governor using a stepping motor for setting the desired values and mechanical actual value indication means. Monitoring means are provided which are positively coupled with the circular indexing table and/or a driving gear of the hydraulic motor and which indicate whether or not the circular indexing table is in a position suitable for bringing an indexing gear into engagement and, if so, emits a signal triggering the indexing process. If the circular indexing table is not in a suitable position, the monitoring means deactivates the indexing mechanism.

By virtue of the above noted features of the present invention, the governor-controlled hydraulic drive permits the motion sequence to be controlled as desired within broad limits, with regard to acceleration, maximum feeding speed and braking. Furthermore, high positioning accuracies and rapid cycle sequences may be achieved.

In accordance with further features of the present invention a monitoring means includes a cam disk coupled with the circular indexing table through a gearing fro insuring that it performs exactly a full rotation of 360° when the circular indexing table moves from a first position suited for processing of the workpiece into the next position. By virtue of this arrangement, it is possible to permit the implementation of a monitoring arrangement by simple technical means. This monitoring arrangement uses an index for monitoring and/or controlling the indexing movements into predetermined positions in a reliable manner.

In order to provide a very simple monitoring disk construction used within the monitoring device, in accordance with still further features of the present invention, a cam disk is provided which includes at least three leading edges which trigger a signal when passing an inductive pick-up provided as position detectors. The first leading edge triggers a high level output signal when passing the associated detector when the circular indexing table reaches a position in which the engagement of the index is possible, but the exact desired position of the circular indexing table has not yet been reached. The second leading edge triggers a high level output signal when passing an inductive pick-up as soon as the exact desired position of the circular indexing table is reached and the circular indexing table starts running beyond the desired position. The third leading edge triggers a high level signal at an inductive pick-up when the circular indexing table has run beyond the angular area suitable for indexing.

It is also possible in accordance with the present invention to advantageously provide an absolute position indicator as part of the monitoring device to permit monitoring of the indexing motion in accordance with freely predetermined desired positions.

Further details, features, and advantages of the present invention will become more apparent from the following description when taken in connection with the accompanying drawings.

BRIEF DESCRIPTION OF THE DRAWINGS

FIG. 2 is a schematic view of a cam disk arrangement forming part of the monitoring arrangement of the present invention.

DETAILED DESCRIPTION

Figure 1:
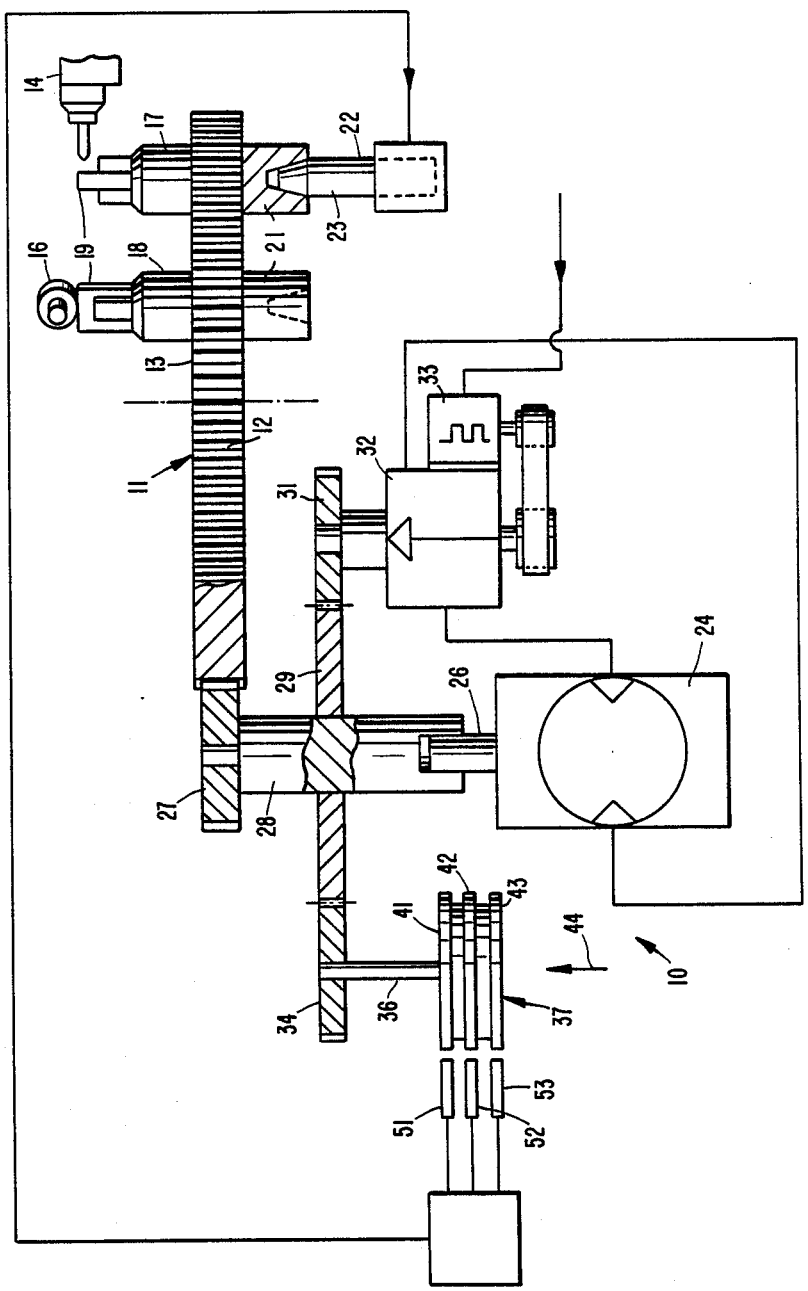
FIG. 1 is a partially schematic cross-section view of a driving arrangement in accordance with the present invention for a machine tool comprising a circular indexing table having several working stations spaced at equal angular distances, and an index for fixing the circular indexing table in the desired positions, as well as a monitoring device comprising a cam disk for monitoring the tolerance range within which indexing is possible.

Referring now to the drawings wherein like reference numerals are used throughout the various views to designate like parts and, more particularly, to FIG. 1, according to this figure, a hydraulic driving arrangement generally designated by the reference numeral 10 for a circular indexing machine generally designated by the reference numeral 11 includes a circular indexing table 13 having an outer gear rim 12, two working stations 14 and 16, two chucks 17, 18 for workpieces 19, two index bodies 21 connected with the chucks 17, 18 and an index 22.

The index 22 comprises an index pin 23 having a frustoconical end portion which fits positively into the index bodies 21 to fix the circular indexing table exactly in that position in which workpieces 19 are in the correct position in all working stations for properly being processed. For example, presuming that a total of eight working stations and a corresponding number of chucks are provided and the working operation carried out at each of the stations 14 or 16 are different, but performed all at the same time, upon completion of each cycle, the circular indexing table 13 is advanced, and, in the illustrated example, advanced by 45° so that, for example, the workpiece 19 previously processed or worked at station 14 can be subjected to the next processing operation at station 16. In order to permit this advancing movement to be performed exactly and as rapidly as possible, the hydraulic drive arrangement is constructed in the manner described herein below.

The driving arrangement 10 comprises a hydraulic motor 24 having a drive shaft 26 rigidly connected through a quick-disconnect plug with a drive pinion 27 engaging the gear rim 12. The shaft 28 of the drive pinion 27 carries a spur gear 29 mounted to rotate with the shaft 28. The spur gear 29 is in meshing engagement with the actual position indicator wheel 31 of a servo-governor 32 taking the form of an electro-hydraulic follow-up control valve which controls the hydraulic motor 24 of the driving arrangement 10 with respect to the driving power and angle of rotation.

It is assumed that the function and structure of the servo-governor 32, which makes use of a stepping motor for setting the desired values and of mechanical actual value indication means, are generally known. A servo-governor suited for this purpose has been built and marketed for many years by applicant. A given number of stepping pulses is linked with a specific angle of rotation of the circular indexing table, the number of stepping pulses related to the indexing angle, here 45°, defining the tolerances within which exact positioning will be achieved by the driving arrangement 10. By properly controlling the frequency of the pulse sequence triggering the stepping motor 33, the motion sequence of the indexing movement of the circular indexing table 13 can be varied as desired within very broad limits. In particular, it is thus possible to ensure that the chucks 17 and 18 come to stop smoothly in their preset positions, while high rotary speeds can be achieved between the stops. The driving arrangement 10 is not bound to specific steps widths, corresponding to the angular spacing of the chucks 17 and 18 or the working stations 14 and 16. Rather, it is possible to move the indexing table 13 through any desired multiple of the angular spacing of the working stations 14 and 16 so that a workpiece 19 which has been processed at working station 14 can be transferred directly, for the example, to the next but one working station, without intermediate stop. The governor-controlled operation of the hydraulic motor 24 ensures also that in case the circular indexing table 13 should get jammed no excessive driving forces will be transmitted through the driving pinion 27 to the circular indexing table 13 which could lead to destruction.

The spur gear 29 which rotates in synchronism with the driving pinion is further in meshing engagement with a spur gear 34 whose shaft 36 carries a monitoring disk 37 which due to the given gear transmission ratios performs a full rotation by 360° when the circular indexing table 13 rotates by 45°, i.e. completes an indexing step. The disk 37 comprises three cam portions 41, 42 and 43 each associated with an inductive pick-up 51, 52 and 53. Viewed in the direction indicated by the arrow 44 in FIG. 1, the three cam portions 41, 42 and 43 have each the contour shown in FIG. 2. When the disk 37 and, thus, the cam portions 41, 42 and 43, which are rigidly interconnected, rotate in clockwise direction, i.e. the direction indicated by the arrow 46 in FIG. 2, the output signal levels of the individual inductive pick-ups 51, 52 and 53 change every time one of the leading edges of the cams traverses the longitudinal axis of the pick-up. We will assume for the purposes of this specification that each of the inductive pick-ups 51, 52 and 53 is set to high output signal level when the cams 61, 62 and 63 with their leading edges 66, 67 and 68 moves past the respective pick-up, and that they return to low signal level when the trailing edges 71, 72 or 73 traverse the director axes when moving in the direction indicated by the arrow 46.

The functional unit described before which comprises the monitoring disk 37 and the inductive pick-ups 51, 52 and 53, permits the monitoring and/or controlling of the entry of the index pin into the position in which it fixes the circular indexing table in its desired positions: by varying the angular spacing between the leading edge 68 of the cam 63 and the leading edge 67 of the cam 62, whereby it is passible to determines the angle within which the index 22 can engage the index body 21. In this position, the leading edge 66 of the cam 61 of the monitoring disk is exactly aligned with the axis of its inductive pick-up 51; otherwise it musts be adjusted to ensure such alignment. Thus, the position in which the output signal of the inductive pick-up 51 changes from low signal level to high signal level defines the zero position with respect to which tolerances may be admitted. The value of such tolerances is linked with the positive and negative angular spacings of the leading edges 68 and 67 from the leading edge 66. When operating properly, the function of the monitoring device is as follows. If, after completion of an indexing cycle the high level output signal of the inductive pick-up 53 is present only, the index 22 may engage the respective index body. The same applies in case the high level output signal of the zero position pick-up 51 is present in addition to the high level output signal of the inductive pick-up 53. But when a high level output signal is simultaneously encountered at the output of the inductive pick-up 52, indexing may not take place because this indicates that the table must have been rotated past the desired position. If only a high level output signal is obtained from the inductive pick-up 52, then there must be some fault, because otherwise the high level output signal of the detector 53 would be present, too.

The monitoring disk 37 can be designed for the most different indexing values of the circular table, by properly selecting the transmission ratios for translating the angular rotary movement of the circular indexing table into 360° rotations of the monitoring disk 37. On the governor side, the driving arrangement 10 can be easily adapted to different pre-determined angular indexing amounts in the known manner.

I claim:

1. A hydraulic driving arrangement for positioning workpiece in a correct relationship to tool heads of a machine tool having a plurality of stations arranged at preferably equal angular spacings about an axis of a circular indexing table, the workpieces being subjected to a sequence of different processing operations carried out at respective ones of the plurality of different working stations, and cyclically advanced from working station to working station, an exact position of the workpieces being defined by an index which, after the circular indexing table has been moved to an approximate position, within pre-determined tolerances, enters into a locking engagement with one of a plurality of index bodies associated with different positions of the circular indexing table so as to move and retain the workpieces in the correct position relative to the individual tool heads required for precise processing, the hydraulic driving arrangement comprising a hydraulic motor for driving the indexing table, an electro-hydraulic follow-up governor means for controlling the hydraulic motor including a stepping motor for setting desired values and mechanical actual value indication means, monitoring means are positively coupled with at least one of the circular indexing table and a driving gear of the hydraulic motor for indicating whether the circular indexing table is in a position suitable for bringing an indexing gear into engagement and for supplying a signal for triggering the indexing process and deactivating the indexing mechanism if the indexing table is not in a suitable position.

2. A hydraulic driving arrangement according to claim 1, wherein the monitoring means comprises a cam disk coupled with the circular indexing table through a gearing means for ensuring a full rotation of 360° when the circular indexing table moves from a first position suited for processing of the workpiece into a following position.

3. A hydraulic driving arrangement according to claim 2, wherein the cam disk comprises at least three leading edges for triggering a signal when passing an inductive pick-up provided as position detectors, the first leading edge triggering a high level output signal when passing an associated position detector when the circular indexing table reaches a position in which engagement of the index is possible, but the exact desired position of the circular indexing table is not yet reached, the second leading edge triggering a high level output signal when passing the inductive pick-up as soon as the exact desired position of the circular indexing table is reached and the circular indexing table starts running beyond the said desired position, and the third leading edge triggering a high level signal at the inductive pick-up when the circular indexing table has run beyond an angular area suitable for indexing.

* * * * *